United States Patent Office 2,726,229
Patented Dec. 6, 1955

2,726,229
POLYMERIZABLE AND POLYMERIZED COMPOSITIONS COMPRISING AN UNSATURATED GUANAMINE AND ACRYLONITRILE

John J. Padbury, Springdale, and John A. Price, Stamford, Conn., assignors to American Cyanamid Company, New York, N. Y., a corporation of Maine No Drawing. Application July 18, 1952,
Serial No. 299,728
9 Claims. (Cl. 260—85.5)

This invention relates to the production of new materials having valuable and characteristic properties that make them especially suitable for use in industry, for example in molding, casting, laminating and adhesive applications, as a fiber-forming material, as an intermediate in the production of other resinous compositions, and for other purposes. More particularly the invention is concerned with polymerizable compositions comprising (1) a compound represented by the general formula

I

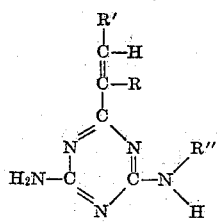

where R represents a member of the class consisting of hydrogen and the methyl radical, R' represents a member of the class consisting of hydrogen and the phenyl radical, and R'' represents a member of the class consisting of hydrogen and alkyl, aralkyl and aryl radicals, and (2) a compound which is different from the compound of (1), which is copolymerizable therewith and which contains a CH$_2$=C< grouping, e. g., styrene, acrylonitrile, ethyl acrylate, methyl methacrylate, vinyl acetate, diallyl phthalate, etc., or a plurality of such compounds. In our new polymerizable compositions the compound of (1), which is an unsaturated guanamine, constitutes from 1% (about 1%) to 75% (about 75%), advantageously (for the usual applications) from 1% to 50%, by weight of the total amount of (1) and (2). The scope of the invention also includes products comprising the polymerized composition obtained by polymerization of the aforementioned polymerizable composition, as well as method features whereby new and useful synthetic compositions are produced. The claims of the present application are directed specifically to those compositions and products wherein the compound of (2) is acrylonitrile, and the compound embraced by Formula I constitutes from about 1% to about 50% by weight of the total amount of (1) and (2).

Illustrative examples of radicals represented by R'' in the above formula are alkyl (including cycloalkyl), e. g., methyl to octadecyl, inclusive, and the various isomeric forms thereof, cyclopentyl, cyclohexyl, cycloheptyl, etc.; aralkyl, e. g., benzyl, phenylethyl, phenylpropyl, etc.; and aryl (including alkaryl), e. g., phenyl, diphenyl, biphenylyl or xenyl, tolyl, xylyl, ethylphenyl, etc.

Illustrative examples of compounds embraced by Formula I are acryloguanamine, the formula for which is

II

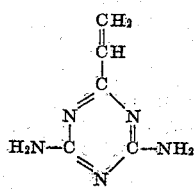

methacryloguanamine, the formula for which is

III

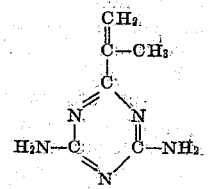

cinnamoguanamine, the formula for which is

V

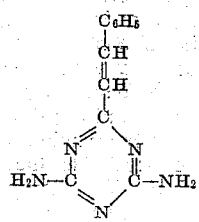

and N-phenylmethacryloguanamine, the formula for which is

V

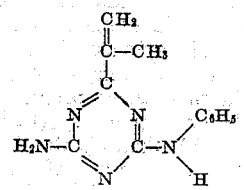

Other examples will be apparent to those skilled in the art from Formula I and the aforementioned definitions of R, R' and R'', and from the numerous illustrative examples, hereinbefore given, of alkyl, aralkyl and aryl radicals represented by R'' in the said formula.

The unsaturated guanamines used in carrying the present invention into effect are prepared by known methods, for example as disclosed and claimed in Patent No. 2,461,943, dated February 15, 1949. In general, these alpha,beta-unsaturated guanamines are produced by effecting reaction between biguanide or a 1-substituted biguanide and an ester of an alpha,beta-unsaturated aliphatic carboxylic acid.

It is one of the primary objects of the present invention to prepare a new class of copolymers or interpolymers for use in industry.

Still another and important object of the invention is the production of copolymers or interpolymers of a basic monomer, more particularly an unsaturated guanamine of the kind embraced by Formula I, and one or more non-basic monomers, e. g., acrylonitrile, which polymerization products are more readily dyed, especially with an acid dye, than polymers of acrylonitrile or other non-basic monomer alone, or than many of the previously known or suggested copolymers of (1) acrylonitrile (or other non-basic monomer) and (2) another different monomer or monomers.

Another object of the invention is to prepare copolymers which can be spun or otherwise shaped to form filaments, tapes, ribbons, tubes, rods, sheets, etc., and the shaped articles then dyed either before or after having been oriented or treated to improve their useful properties.

Another and important object of the invention is to produce copolymers which are particularly valuable as intermediates for use in the preparation of other resinous materials, for example as disclosed and claimed in the copending application of Walter M. Thomas, Serial No. 299,745, filed concurrently herewith, now Patent No. 2,689,238, dated September 14, 1954.

Other objects of the invention will be apparent to those skilled in the art from the description and examples which follow.

The foregoing objects are attained by copolymerization of an unsaturated guanamine of the kind embraced by Formula I with one or more other comonomers which are copolymerizable therewith, more particularly such comonomers which contain either a single or a plurality of $CH_2=C<$ groupings, using, by weight, from about 1% to about 75% of the aforementioned unsaturated guanamine and correspondingly from about 99% to about 25% of a different, copolymerizable comonomer (or comonomers) containing one or more $CH_2=C<$ groupings. Heat, light or heat and light can be used to effect or to accelerate polymerization of the mixture of comonomers, although under such conditions the rate of polymerization in some cases may be relatively slow, as for instance when the unsaturated guanamine constitutes only a small amount (e. g., 1 to 5%) of the mixture of comonomers and the other comonomer normally has a slow polymerization rate. Hence, it is usually preferred to accelerate the polymerization by employing a polymerization catalyst accompanied by heat, light or heat and light. Further details of polymerization conditions are given hereinafter.

Examples of monomers (comonomers) containing a $CH_2=C<$ grouping that can be copolymerized with acryloguanamine, methacryloguanamine, cinnamoguanamine, N-phenylmethacryloguanamine or other unsaturated guanamine (or guanamines) of the kind embraced by Formula I in the weight proportions hereinbefore mentioned, singly or a plurality (two, three, four or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e. g., methacrylic, ethacrylic, propacrylic, etc., and arylacrylic, e. g., phenylacrylic, etc.), crotonic, oxalic, malonic, succinic, glutaric, adipic, pimelic, suberic, azelaic, sebacic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e. g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e. g., styrene, o-, m- and p-chlorostyrenes, -bromostyrenes, -fluorostyrenes, -methylstyrenes, -ethylstyrenes, -cyanostyrenes, the various polysubstituted styrenes such, for example, as the various di-, tri- and tetrachlorostyrenes, -bromostyrenes, -fluorostyrenes, -methylstyrenes, -ethylstyrenes, -cyanostyrenes, etc., vinylnaphthalenes, vinylcyclohexanes, vinylfuranes, vinylpyridines, divinylbenzenes, trivinylbenzenes, allylbenzenes, diallylbenzenes, N-vinylcarbazole, the various allyl cyanostyrenes, etc.; the various alpha-substituted styrenes and alpha-substituted ring-substituted styrenes, e. g., alpha-methylstyrene, alpha-methyl-para-methyl styrene, etc.; unsaturated ethers, e. g., ethyl vinyl ether, diallyl ether, ethyl methallyl ether, etc.; unsaturated amides, for instance N-allylcaprolactam, acrylamide and N-substituted acrylamides, etc.; unsaturated ketones, e. g., methyl vinyl ketone, methyl allyl ketone, etc.; methylene malonic esters, e. g., methylene methyl malonate, etc.; unsaturated aliphatic hydrocarbons, e. g., ethylene, propylene, butadienes, e. g., 1,3-butadiene, 2-chlorobutadiene, etc.; unsaturated polyhydric alcohol (e. g., butenediol, etc.) esters of saturated and unsaturated, aliphatic and aromatic, monobasic and polybasic acids, illustrative examples of which appear above; unsaturated glycidyl esters such as glycidyl acrylate, glycidyl methacrylate, glycidyl itaconate, glycidyl allyl phthalate, etc.

Other examples of monomers that can be copolymerized with an unsaturated guanamine of the kind embraced by Formula I to produce our new copolymer compositions are the vinyl halides, more particularly vinyl fluoride, vinyl chloride, vinyl bromide and vinyl iodide, and the various vinylidene compounds, including the vinylidene halides, e. g., vinylidene chloride, vinylidene fluoride and vinylidene iodide, other comonomers being added if needed in order to improve the compatability and copolymerization characteristics of the mixed monomers.

Other and more specific examples of monomeric materials which can be mixed or blended with an unsaturated guanamine of the kind covered by Formula I in the aforementioned proportions, and the resulting homogeneous or substantially homogeneous, polymerizable composition then polymerized, as hereinafter more fully described, to yield new and valuable copolymer compositions are the allyl compounds which are different from the basic monomer used in practicing the present invention and especially those which have a boiling point of at least about 60° C. Of the monomeric materials which can be used the allyl esters form a large class. The reactive allyl compounds employed are preferably those which have a high boiling point such, for example, as diallyl maleate, diallyl fumarate, diallyl phthalate, diallyl succinate, etc. Other allyl compounds which are not necesarily high boiling also may be used.

Additional examples of allyl compounds, and of other compounds containing one or more $CH_2=C<$ groupings that can be used in producing the new and useful copolymers or interpolymers of the present invention, are given in, for example, Drechsel and Padbury Patent No. 2,550,652, dated April 24, 1951, and especially in that portion thereof with particular reference to monomers used in forming copolymers with diallyl cyanamide.

Among the comonomers which are preferred for use in carrying my invention into effect are the vinyl and alpha-substituted vinyl compounds which are different from the primary basic monomer employed, including the vinyl and alpha-substituted vinyl aromatic compounds, more particularly the vinyl and alpha-substituted vinyl aromatic hydrocarbons (e. g., styrene, isopropenyl toluene, the various dialkylstyrenes, etc.), and the vinyl aliphatic compounds, e. g., acrylonitrile, acrylamide, etc., and other and different compounds containing a $CH_2=C<$ grouping, e. g., the various substituted acrylonitriles (e. g., methacrylonitrile, ethacrylonitrile, phenylacrylonitrile, etc.), the various substituted acrylamides (e. g., methacrylamide, ethacrylamide, the various N-substituted acrylamides and alkacrylamides, for instance N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc.; esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the alkyl grouping, examples of which are given above, as well as other vinyl aromatic and vinyl aliphatic compounds, and other compounds containing a $CH_2=C<$ grouping.

Any suitable means may be used in effecting polymerization of the admixture of the unsaturated guanamine of the kind embraced by Formula I, and one or more other monomers which are copolymerizable therewith. As has been mentioned hereinbefore heat or light or both, with or without a polymerization catalyst, can be used. Ultraviolet light is more effective than ordinary light. Preferably a polymerization catalyst is employed. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tert.-butyl) peroxide and di-(tert.-amyl) peroxide; the alkyl hydrogen peroxides, e. g., tert.-butyl hydrogen peroxide, tert.-amyl hydrogen peroxide, etc.; symmetrical diacyl peroxides, for instance peroxides which commonly are known under such names as acetyl peroxide, propionyl peroxide, lauroyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic peracids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxides and of other catalysts that can be employed are given in, for example, the aforementioned Drechsel and Padbury Patent No. 2,550,652.

The concentration of the catalyst employed is usually small, that is, for the preferred catalysts from, by weight, about 0.5 or 1 part of catalyst per thousand parts of the polymerizable composition to be polymerized to about 4 or 5 or more parts of catalyst per 100 parts of the mixture of comonomers. If an inhibitor of the kind hereinafter mentioned be present, larger amounts of catalyst may be necessary according to the concentration of the inhibitor.

If desired, the mixed monomers can be polymerized in emulsion or in solution state to yield a copolymer. In the latter case, various inert organic or other solvents may be employed, depending upon the particular comonomer used, e. g., toluene, xylene, dioxane, ethers (e. g., dibutyl ether), esters (e. g., butyl acetate), chlorobenzene, ethylene dichloride, ketones (e. g., methyl ethyl ketone), tertiary alcohols, for instance tertiary-butyl alcohol, tertiary-amyl alcohol, tertiary-hexyl alcohol, etc., as well as others.

The polmerization also can be effected by conventional bulk polymerization technique, in the presence or absence of a solvent capable of dissolving the monomeric mixture and in which the latter preferably is inert; or in solution in a solvent in which the monomeric mixture is soluble but the copolymer is insoluble; or by conventional bead polymerization methods. The polymerization of the mixture of monomers can be effected by a continuous process as well as by a batch operation.

The temperature of polymerization of the polymerizable composition, at atmospheric or slightly above atmospheric pressure and in the presence or absence of a polymerization catalyst, can be varied over a wide range, up to and including or slightly above the boiling point (at atmospheric pressure) of the monomeric mixture (or of the lowest boiling component thereof), but in all cases is below the decomposition temperature of the monomeric materials. In most cases the polymerization temperature will be within the range of 15° C. to 150° C. more particularly within the range of 20° C. or 30° C. (ordinary room temperature) to 130° C., depending upon the particular mixture of monomers employed, the particular catalyst, if any, used, the rapidity of polymerization wanted, and other influencing factors. With certain catalysts, more particularly strong acidic polymerization catalysts such, for instance, as gaseous boron trifluoride-ethyl ether complex, concentrated sulfuric acid, anhydrous aluminum chloride, etc., a substantially lower polymerization temperature often advantageously may be used, e. g., temperatures ranging between −80° C. and 0° C. or 10° C. At the lower temperatures below the solidification point of monomeric mixture (or components thereof), polymerization is effected while the mixture of monomers is dissolved or dispersed in a solvent or dispersion medium which is liquid at the temperature of polymerization. Or, if desired, the monomeric mixture, that is, the polymerizable composition, can be polymerized in dissolved or dispersed state at temperatures above its solidification point or above the solidification point of the polymerizable components thereof. The copolymer can be separated from the liquid medium in which copolymerization was effected by any suitable means, e. g., by filtration, centrifuging, solvent extraction, etc.

In some cases it may be desirable to incorporate into the polymerizable composition an inhibitor which is adapted to inhibit copolymerization of the individual monomers present in the composition. When it is desired to use the inhibitor-modified composition, a catalyst is added in an amount sufficient to promote the polymerization reaction and to yield a copolymer. Any suitable inhibitor can be used, e. g., tannin, phenol, resorcinol, hydroquinone, ascorbic acid, isoascorbic acid, phenyl-α-naphthylamine, N, N′-di-2-naphthyl-p-phenylene-diamine, certain cupric salts, e. g., cupric acetate, etc. The amount of the polymerization inhibitor may be considerably varied, but ordinarily it is employed in an amount not exceeding 3%, generally less than 1%, by weight of the monomer or mixture of comonomers, e. g., from 0.01% to 0.5% or 0.6% by weight thereof.

In order that those skilled in the art may better understand how the present invention can be carried into effect, the following examples are given by way of illustration and not by way of limitation. All parts and percentages are by weight.

EXAMPLE 1

*Copolymer of methyl methacrylate and methacryloguanamine*

To a reaction vessel equipped with a reflux condenser are added 45 parts of methyl methacrylate, 5 parts of methacryloguanamine, 1.9 parts of sulfuric acid, 500 parts of water and 1 part of potassium persulfate. The resulting solution is heated in the reaction vessel on a steam bath for one hour. The copolymer of methyl methacrylate and methacryloguanamine that precipitates is collected on a Büchner funnel and washed with 2500 parts of water. After drying in an oven at 70° C. for 2 hours, 43 parts of a white copolymer of methyl methacrylate and methacryloguanamine is obtained.

EXAMPLE 2

*Copolymer of styrene and methacryloguanamine*

To a reaction vessel equipped with a reflux condenser are added 45 parts of styrene, 5 parts of methacryloguanamine, 1.9 parts of sulfuric acid, 250 parts of water, 2.5 parts of a cationic emulsifying agent, specifically cetyldimethylbenzyl ammonium chloride, and 0.5 part of ammonium persulfate. The vessel containing the resulting emulsion is heated on a steam bath for 3 hours. The copolymer of styrene and methacryloguanamine which precipitates at the end of this period of time is collected on a Büchner funnel and washed with 2500 parts of water. The washed copolymer is dried in an oven at 70° C. for 2 hours, yielding a dry, white copolymer of styrene and methacryloguanamine.

EXAMPLE 3

*Copolymer of N-phenylmethacryloguanamine, styrene and butyl acrylate*

|  | Parts |
|---|---|
| N-Phenylmethacryloguanamine | 20 |
| Styrene | 40 |
| Butyl acrylate | 40 |
| Ethylene glycol monomethyl ether | 300 |
| Cumene hydroperoxide | 5 |

The above ingredients are heated together under reflux (about 125° C.) in a reaction vessel placed on an oil bath for 6 hours. A clear, nearly water white, viscous product is obtained. A clear, hard, colorless film of a copolymer of the unsaturated guanamine, styrene and butyl acrylate is produced by casting a film of the viscous syrup on a glass plate, followed by drying for 15 minutes at 130° C.

EXAMPLE 4

*Copolymer of methacryloguanamine, styrene and butyl acrylate*

The same procedure is followed as described under Example 3 with the exception that 200 instead of 300 parts of ethylene glycol monomethyl ether and 1 part in place of 5 parts of cumene hydroperoxide are used. A viscous, syrupy, copolymer solution similar to that of the product of Example 3 is obtained. Films of this syrup form hard, clear copolymers of methacryloguanamine, styrene and butyl acrylate when cast, air-dried and heated in the same manner as described under Example 3.

EXAMPLE 5

*Copolymer of acryloguanamine and butyl acrylate*

A solution of 20 parts of acryloguanamine in 300 parts of ethylene glycol monomethyl ether is first filtered to remove a trace of insoluble material which is present therein. To the filtrate are added 80 parts butyl acrylate and 1 part cumene hydroperoxide. After refluxing the resulting solution for 6 hours, the product is a clear, thin syrup. A film of the syrupy product is air-dried and then baked for 20 minutes at 130° C. The baked film of the copolymer of acryloguanamine and butyl acrylate is clear and somewhat soft. The product of this example is suitable for use in various adhesive applications.

EXAMPLE 6

*Copolymer of methacryloguanamine and mixed isomers of methylstyrene*

|  | Parts |
|---|---|
| Methacryloguanamine | 30 |
| Mixed isomers of methylstyrene [1] | 70 |
| Ethylene glycol monomethyl ether | 200 |
| Cumene hydroperoxide | 1 |

[1] *Note.*—Approximately a 50–50% mixture of m- and p-methylstyrenes.

The above ingredients are heated together under reflux for 6 hours in a reaction vessel placed on an oil bath, yielding a very viscous solution of a copolymer of methacryloguanamine and the mixed isomers of methylstyrene. One hundred parts of benzyl alcohol is added to the solution, as a result of which the solution becomes clearer and less viscous. A film of this solution is cast on a glass plate, which is then air-dried to yield a hard, clear copolymer of the unsaturated guanamine and the mixed isomers of methylstyrene.

EXAMPLE 7

This example illustrates the preparation of homopolymeric acrylonitrile, which is subsequently employed in comparative tests with certain of the copolymers of the present invention.

A reaction vessel, equipped with a stirrer, reflux condenser, thermometer and gas-inlet tube, is placed in a constant-temperature bath which is maintained at 35° C. To the vessel is added a solution of 53.0 parts of acrylonitrile, 900 parts of distilled water and 0.29 part of sulfuric acid. The pH of the initial solution is 3.1. A rapid stream of pre-purified nitrogen is passed over the surface of the solution for 30 minutes. The nitrogen flow is then reduced to about one bubble per second. A reduction-oxidation catalyst system ("redox" system) consisting of 1.71 parts of ammonium persulfate and 0.71 part of sodium meta-bisulfite, each dissolved in 50 parts of water, is then added. The solution first becomes cloudy at the end of 3 minutes, and the polymerization is fairly exothermic for the first half hour. The polymerization is continued for a total of 4 hours at 35° C. The polymer is collected on a Büchner funnel, and washed with 1000 parts of distilled water followed by about 160 parts of methanol. The polymer is dried in an oven at 70° C. for about 16 hours. The yield of dry polyacrylonitrile, which is white, amounts to 48 parts.

EXAMPLE 8

*Copolymer of acrylonitrile and methacryloguanamine*

To a reaction vessel equipped as in Example 7 is added a solution of 47.7 parts of acrylonitrile, 5.3 parts of methacryloguanamine, 800 parts of demineralized water and 1.58 parts of sulfuric acid. The pH of this solution is 3.2. A rapid stream of pre-purified nitrogen gas is passed over the surface of the solution for 30 minutes. The nitrogen flow is then reduced to about 2 or 3 bubbles per second. A reduction-oxidation catalyst system is prepared by dissolving 1.71 parts of ammonium persulfate and 0.36 part of sodium meta-bisulfite, each in 100 parts of water. Portions of each solution are added to the reaction vessel at 25-minute intervals over a period of 2.5 hours. During this period the temperature is maintained at 35° C. The polymerization is allowed to continue for a total period of 6 hours. The product is collected on a Büchner funnel, washed with 2000 parts of demineralized water and dried in an oven for 16 hours at 70° C. Forty-nine (49) parts of a dry, white copolymer of acrylonitrile and methacryloguanamine is obtained.

EXAMPLE 9

*Copolymer of acrylonitrile and N-phenylmethacryloguanamine*

To a reaction vessel equipped as in Example 7 is added a solution of 47.7 parts of acrylonitrile, 5.3 parts of N-phenylmethacryloguanamine, 900 parts of demineralized water and 0.92 part of hydrochloric acid. The pH of this solution is 2.6. A rapid stream of pre-purified nitrogen gas is passed over the surface of the solution for 30 minutes. The nitrogen flow is then reduced to about 2 or 3 bubbles per second. A redox catalyst system is prepared by dissolving 1.71 parts of ammonium persulfate and 0.36 part of sodium meta-bisulfite, each in 100 parts of water. The catalyst solutions are added portionwise to the reaction vessel at 25-minute intervals over a period of 2.5 hours. The temperature is maintained at 35° C. After a total period of 5 hours, the product is collected on a Büchner funnel, washed with 2000 parts of demineralized water and dried in an oven at 70° C. for 16 hours. Fifty-one (51) parts of a dry, white copolymer of acrylonitrile and N-phenylmethacryloguanamine is obtained.

EXAMPLE 10

*Copolymer of acrylonitrile and N-benzylacryloguanamine*

Exactly the same procedure is followed as described under Example 9 with the exception that there are used 50.35 parts instead of 47.7 parts of acrylonitrile; 2.65 parts of N-benzylacryloguanamine in place of 2.65 parts of N-phenylmethacryloguanamine; and 0.43 part instead of 0.92 part of hydrochloric acid. A portion of the dry, solid copolymer of acrylonitrile and N-benzylacryloguanamine is employed in dye tests described in a later example.

EXAMPLE 11

Copolymer of acrylonitrile and N-isopropylmethacryloguanamine

Same as in Example 9 with the exception that there are used 45.05 instead of 47.7 parts of acrylonitrile; 7.95 parts of N-isopropylmethacryloguanamine in place of 2.65 parts of N-phenylmethacryloguanamine; and 2.02 parts of sulfuric acid instead of 0.92 part of hydrochloric acid. A portion of the dry, solid copolymer of acrylonitrile and N-isopropylmethacryloguanamine is employed in dye tests described in a later example.

EXAMPLE 12

Copolymer of acrylonitrile and cinnamoguanamine

To a reaction vessel equipped with a reflux condenser are added 47.7 parts of acrylonitrile, 5.3 parts of cinnamoguanamine, 900 parts of demineralized water, 1.1 parts of hydrochloric acid and 0.53 part of ammonium persulfate dissolved in 100 parts of water. The solution is heated on a steam bath for 2 hours. The product is collected on a Büchner funnel, washed with 2000 parts of demineralized water and dried in an oven at 70° C. for 16 hours. Twenty-nine (29) parts of a dry, white copolymer of acrylonitrile and cinnamoguanamine are obtained.

EXAMPLE 13

Copolymer of acrylonitrile and methacryloguanamine

To a reaction vessel equipped with a reflux condenser are added 3 parts of acrylonitrile, 1 part of methacryloguanamine, 50 parts of water, 0.37 part of sulfuric acid and 0.04 part of potassium persulfate. The solution is heated on a steam bath for one hour. The product is collected on a Büchner funnel, washed with 200 parts of water and dried in an oven at 70° C. The yield of dry, white copolymer of acrylonitrile and methacryloguanamine amounts to 2.8 parts.

EXAMPLE 14

Samples of the homopolymeric acrylonitrile of Example 7 and of the copolymers of Examples 8 to 13, inclusive, are subjected to the following dye test.

A sample (5 parts) of the dry polymer or copolymer is added to a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath is boiled for 30 minutes, after which the polymerization product is filtered off and washed with hot water until the water is free of dye. The copolymers of 8 to 13, inclusive, are dyed blue, whereas the homopolymeric acrylonitrile of Example 7 fails to absorb any dye. The advantage of modifying an acrylonitrile polymerization product by replacing a part (e. g., from about 1% to about 20 or 25% or more, still more particularly from 2 or 3% to 10 or 15%) of the initial acrylonitrile with an ethylenically unsaturated guanamine of the kind embraced by Formula I, thereby to obtain a copolymeric acrylonitrile substance of improved dyeability, is therefore quite apparent.

EXAMPLE 15

Copolymer of vinyl acetate and methacryloguanamine

To a reaction vessel are added 49.5 parts of vinyl acetate, 0.5 part of methacryloguanamine, 200 parts of water, 0.13 part of hydrochloric acid (in terms of 100% acid), and 0.5 part of potassium persulfate. The solution is heated on a steam bath for 5 hours. The product is collected, washed with 500 parts of water and dried in an oven at 70° C. Forty-five parts of a dry, white, rubbery copolymer of vinyl acetate and methacryloguanamine is obtained.

EXAMPLE 16

Copolymer of methylene-bis-acrylamide and methacryloguanamine

To a reaction vessel are added 75 parts of methacryloguanamine, 25 parts of methylene-bis-acrylamide, 2400 parts of water and 29 parts of sulfuric acid. Solution is complete after the mixture has been warmed on a steam bath for a few minutes. To the solution is now added 2 parts of ammonium persulfate, and heating on the steam bath is continued for 2 hours. The product is collected, washed with 1000 parts of water and dried in an oven at 70° C. for 4 hours. A nearly quantitative yield of a dry, white copolymer of methylene-bis-acrylamide and methacryloguanamine is obtained.

The new copolymers of this invention containing the lower percentages of unsaturated guanamine, e. g., from 1% to 20 or 25%, of the total amount of unsaturated guanamine and other copolymerizable monomer, e. g., acrylonitrile, are particularly useful in the formation of fibers or filaments which are more amenable to dyeing than, for example, homopolymeric acrylonitrile. Such copolymers, as well as those containing the higher percentages of unsaturated guanamine, that is to say, up to 50%, or even as high as 70 or 75%, of the total amount of unsaturated guanamine and other copolymerizable monomer are also very useful as intermediates for the production of other new and valuable resinous materials, as is more fully described and claimed in the aforementioned copending application of Walter M. Thomas, Serial No. 299,745, filed concurrently herewith. However, they also have numerous other applications in the plastics and coating arts. For instance, with or without a filler or other additive, they may be used as molding compositions (or as components of molding compositions) from which molded articles are produced by molding the compositions under heat and pressure, e. g., temperatures of the order of 130° C. or 140° C. to 200° C. and under pressures up to 10,000 pounds or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions of our invention can be used in the production of castings of any desired shape or size; as adhesives; in the treatment of paper or paper stock; in coating compositions; and for various other purposes. The copolymer can be formed in situ after application of the monomeric mixture to the base material to be coated, impregnated or otherwise treated.

Fibers can be produced from many of the copolymers of the present invention in the manner described in, for example, Patents 2,558,730, –731 and 733 with particular reference to the production of a molecularly oriented fiber from homopolymeric or copolymeric acrylonitrile. The unoriented and oriented fibers produced from our new fiber-forming copolymers are readily dyed, especially with an acid dye, while the fiber is in either a gel (e. g., hydrogel or aquegel) or a dry state.

The new materials (polymerizable compositions and polymerization products) of this invention have numerous other uses, for example uses such as are given in the aforementioned Drechsel and Padbury Patent No. 2,550,652.

We claim:
1. A polymerizable composition comprising (1) a compound represented by the general formula

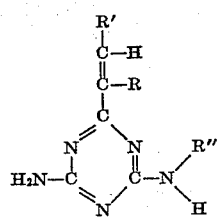

where R represents a member of the class consisting of hydrogen and the methyl radical, R' represents a member of the class consisting of hydrogen and the phenyl radical, and R" represents a member of the class consisting of hydrogen and alkyl, aralkyl and aryl radicals, and (2) acrylonitrile, the compound of (1) constituting from about 1% to about 50% by weight of the total amount of (1) and (2).

2. A product comprising the ploymerized composition of claim 1.

3. A composition comprising a copolymer of copolymerizable ingredients including (1) acrylonitrile and (2) a compound represented by the general formula

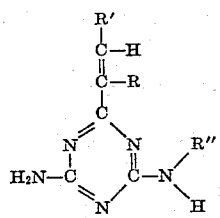

where R represents a member of the class consisting of hydrogen and the methyl radical, R' represents a member of the class consisting of hydrogen and the phenyl radical, and R" represents a member of the class consisting of hydrogen and alkyl, aralkyl and aryl radicals, the compound of (2) constituting from 1% to 20% by weight of the total amount of (1) and (2).

4. The method of preparing a new synthetic composition which comprises polymerizing, with the aid of a polymerization catalyst, a polymerizable composition comprising (1) a compound represented by the general formula

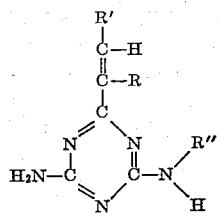

where R represents a member of the class consisting of hydrogen and the methyl radical, R' represents a member of the class consisting of hydrogen and the phenyl radical, and R" represents a member of the class consisting of hydrogen and alkyl, aralkyl and aryl radicals, and (2) acrylonitrile, the compound of (1) constituting from about 1% to about 50% by weight of the total amount of (1) and (2).

5. A copolymer of about 90% by weight of acrylonitrile and about 10% by weight of methacryloguanamine.

6. A composition comprising a copolymer of copolymerizable ingredients including (1) acryloguanamine and (2) acrylonitrile, the compound of (1) constituting from 1% to 50% by weight of the total amount of (1) and (2).

7. A composition comprising a copolymer of copolymerizable ingredients including (1) methacryloguanamine and (2) acrylonitrile, the compound of (1) constituting from 1% to 50% by weight of the total amount of (1) and (2).

8. A composition comprising a copolymer of copolymerizable ingredients including (1) cinnamoguanamine and (2) acrylonitrile, the compound of (1) constituting from 1% to 50% by weight of the total amount of (1) and (2).

9. A composition comprising a copolymer of copolymerizable ingredients including (1) N-phenylmethacryloguanamine and (2) acrylonitrile, the compound of (1) constituting from 1% to 50% by weight of the total amount of (1) and (2).

References Cited in the file of this patent

UNITED STATES PATENTS

| | | |
|---|---|---|
| 2,385,765 | Thurston | Sept. 25, 1945 |
| 2,459,710 | Mackay et al. | Jan. 18, 1949 |
| 2,461,943 | Thurston | Feb. 15, 1949 |
| 2,510,503 | Kropa | June 9, 1950 |

FOREIGN PATENTS

| | | |
|---|---|---|
| 930,681 | France | Aug. 18, 1947 |